(12) United States Patent
Imai

(10) Patent No.: US 6,373,063 B1
(45) Date of Patent: Apr. 16, 2002

(54) METHOD AND APPARATUS FOR READING AND RECORDING IMAGE INFORMATION

(75) Inventor: Shinji Imai, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 112 days.

(21) Appl. No.: 09/613,452

(22) Filed: Jul. 10, 2000

(30) Foreign Application Priority Data

Jul. 8, 1999  (JP) ............................................ 11-194546

(51) Int. Cl.$^7$ ............................................... H01L 25/00
(52) U.S. Cl. .......................... 250/370.09; 250/370.12; 250/370.13
(58) Field of Search ...................... 250/370.09, 370.12, 250/370.13

(56) References Cited

U.S. PATENT DOCUMENTS

| | | | |
|---|---|---|---|
| 4,535,468 A | | 8/1985 | Kempter ........................ 378/31 |
| 4,571,494 A | * | 2/1986 | Nishiki et al. ............... 250/370 |
| 5,528,043 A | * | 6/1996 | Spivey ................... 250/370.09 |
| 5,969,360 A | * | 10/1999 | Lee ......................... 250/370.09 |
| 6,310,351 B1 | * | 10/2001 | Zur ......................... 250/370.09 |

FOREIGN PATENT DOCUMENTS

| | | |
|---|---|---|
| JP | 10-232824 | 9/1998 |
| JP | 11-87922 | 3/1999 |
| JP | 11-89553 | 4/1999 |

OTHER PUBLICATIONS

Humbert de Monts et al., "A New Photoconductor Imaging System for Digital Radiography" pp. 105–109, Jan./Feb. 1989.

* cited by examiner

*Primary Examiner*—Scott J. Sugarman
*Assistant Examiner*—Mohammed Hasan
(74) *Attorney, Agent, or Firm*—Sughrue Mion, PLLC

(57) ABSTRACT

In a method and an apparatus for recording radiation image information of a subject on an electrostatic recording material, photoelectromotive force noise is reduced and stabilized. The apparatus comprises a switch 52 for switching voltage supply from a power supply 53 to a detector 10, a high voltage generator 62 for supplying a high voltage HV to a radiation source 61, and control means 70 for controlling light source control means 40. The control means 70 causes a control signal C2 input to the switch 52 to become LOW so that an electrode of a first electrode layer 11 and a stripe electrode 16 have the same potential. In this state, the control means causes a control signal C1 input to the light source control means 40 to become LOW and causes a planer light source 30 to emit EL light as pre-exposure light. Pre-reading in which this pre-exposure light is irradiated on a reading photoconductive layer 14 is carried out in this manner. After the pre-reading is stopped by stopping the pre-exposure light irradiation, radiation Q is irradiated on the first electrode layer 11 in a state where a recording voltage is applied between the electrode of the first electrode layer 11 and the stripe electrode 16, and an electrostatic latent image is recorded in the detector 10.

12 Claims, 7 Drawing Sheets

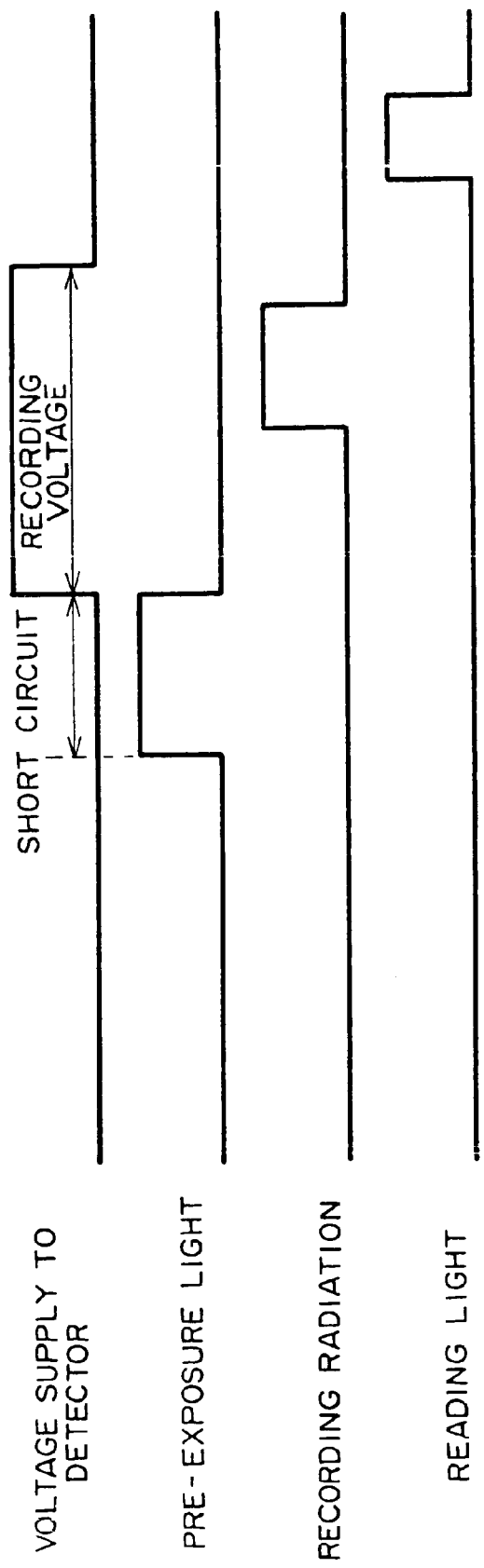
F I G. 2

METHOD AND APPARATUS FOR READING AND RECORDING IMAGE INFORMATION

BACKGROUND OF THE INVENTION

1. Field of the Invention

The present invention relates to a method and an apparatus for recording image information as an electrostatic latent image on an electrostatic recording material and for reading the electrostatic latent image having been recorded.

2. Description of the Related Art

In the field of radiography in medicine for example, radiation image information reading systems have been widely known. In radiography, in order to reduce a radiation dose on a patient and to improve diagnostic performance, a photoconductive material such as a selenium plate comprising a-Se (amorphous selenium) sensitive to X rays is used as an electrostatic recording material (a photosensitive material, a solid-state radiation detector). Radiation for recording, such as X rays, representing radiation image information is irradiated on the electrostatic recording material and a latent image charge representing the radiation image information is stored in a capacitor of the electrostatic recording material. Thereafter, reading light (an electromagnetic wave for reading) such as a laser beam scans the electrostatic recording material and a latent image represented by the latent image charge, that is, the radiation image information, is read by detecting a currrent generated by the scan within the electrostatic recording material by using plate electrodes or comb electrodes on both sides of the electrostatic recording material.

In such a system, the electrostatic recording material comprising the electrodes at both ends thereof and at least one photoconductive layer located inside of the electrodes are used. Radiation for recording is irradiated when a voltage for recording is supplied to the electrodes at both ends, and the latent image is formed in the capacitor of the electrostatic recording material. Thereafter, the electrodes at both ends are made to have the same potential (generally short-circuited), and the photoconductive layer of the electrostatic recording material is scanned with the light for reading, via an electrode having transmissivity to the reading light (hereinafter called an electrode on the reading light side). The latent image is electrically read by photoinductive discharge caused by pairs of electrons and holes (changed couples) generated at an interface between the electrode on the reading light side and the photoconductive layer. In this system, when the latent image is read, no electric current flows in a dark portion of the image while a larger current flows in a lighter portion of the image. This type of system in which the electrodes at both ends of the electrostatic recording material are short-circuited after recording and a larger current flows in a lighter portion of the image is called a positive system, and the electrostatic recording material used in the positive system is called a positive electrostatic recording material.

As a specific layer configuration of such a positive electrostatic recording material, several types can be used. For example, a configuration comprising a first conductive layer (electrode layer on the recording light side; hereinafter this layer is called a first conductive layer), a photoconductive layer for recording, a trap layer as a capacitor, a photoconductive layer for reading, and a second conductive layer (the electrode layer on the reading light side; hereinafter this layer is called a second conductive layer) can be used (U.S. Pat. No. 4,535,468, for example). Another configuration comprising a first conductive layer, a photoconductive layer for recording and reading, and a second conductive layer with a capacitor formed at an interface between the photoconductive layer and the second conductive layer can also be used (see Medical Physics, Vol. 16, No. 1, Jan/Feb 1989; P105–109). Alternatively, a layer configuration comprising a first conductive layer, an insulating layer, a photoconductive layer for recording and reading, and a second conductive layer, with a capacitor formed at an interface between the insulating layer and the photoconductive layer can be used.

The applicant of the present invention has also proposed a positive electrostatic recording material comprising a first conductive layer having transmissivity to radiation for recording, a photoconductive layer for recording exhibiting photoconductivity when receiving the radiation for recording, an electric charge transport layer acting approximately as an insulator to an electric charge having the same polarity as an electric charge in the first conductive layer while acting approximately as a conductor to an electric charge having the reverse polarity of the electric charge in the first conductive layer, a photoconductive layer for reading exhibiting photoconductivity when receiving reading light (an electromagnetic wave for reading), and a second conductive layer having transmissivity to the reading light, with these layers disposed in this order and a capacitor formed at the interface between the photoconductive layer for recording and the electric charge transport layer (Japanese Patent Applications Nos. 10(1998)-232824, 11(1999)-87922, and 11(1999)-89553).

However, in any of the positive electrostatic recording materials described above, a barrier electric field is created at the interface between the second conductive layer having transmissivity to the reading light and the photoconductive layer comprising a-Se or the like. As a result, a so-called photoelectromotive force noise problem, which is a problem caused by a current generated by the reading light even in an area exposed to 0mR recording radiation, occurs.

Furthermore, the photoelectromotive force noise will have local position dependency if the electrostatic recording material is continuously used. As a result, an artifact will be created.

In the photoconductive layer of the electrostatic recording material, a high-resistance amorphous material (having traps) such as a-Se is generally used. During the time from voltage supply (generally a high voltage) between the electrodes at both ends of the electrostatic recording material to the short circuit, an electric charge pours directly from the electrodes to the photoconductive layer. The charge is trapped as a space charge within the photoconductive layer or at the interfaces between the photoconductive layer and the electrodes, and leaked as a dark current in the photoconductive layer instead of being trapped as the space charge. This dark current is stored in the capacitor as a dark latent image upon reading and appears as a dark latent image noise in a reproduced image. This dark current is large in the beginning of the voltage supply, and reduced with time. Thereafter, the dark current reaches a certain leakage current value. In other words, the level of the dark current immediately after the voltage supply is larger than the level of the dark current in a stable state (the state of stable leakage current). This phenomenon is more conspicuous when the voltage is higher, and 10 minutes or more is necessary in some cases to reach the stable leakage current level. Furthermore, even if the stable state is temporarily established, the dark current level tends to reach the previous value when the voltage supply is resumed after a temporary voltage supply cut due to the short circuit between the electrodes at both ends. Therefore, the dark latent image due to the high-level dark current immediately after the voltage supply contributes largely to the reading noise. Moreover, the amount of the dark latent image changes with time from the voltage supply to irradiation of the recording light and with usage history. Therefore, correction of image data so as not to cause the dark latent image noise to appear in a reproduced image is difficult.

Moreover, as has been described above, the electric field generated by the space charge due to the supply of the recording voltage is created at the interfaces between the electrodes and the photoconductive layer. As a result of the short circuit prior to reading, a new electric field due to the history of the voltage supply (generally high voltage supply) and short circuit is created, and a problem of high-voltage supply history noise caused by irradiation of the light (reading light) in existence of the new electric field also occurs. Since this high-voltage supply history noise also changes with time and usage history, correction of this noise is also difficult as the dark latent image noise.

If the recording material is continuously used, the high-voltage supply history noise will have the local position dependency as the photoelectromotive force noise, which leads to generation of an artifact.

Meanwhile, the applicant has proposed an image quality degradation prevention method in Japanese Patent Application No. 10(1998)-232824. In this method, pre-exposure light is irradiated on the photoconductive layer for reading in a state where the voltage is being supplied but the radiation for recording has not been irradiated. By using rectification by the electric charge transport layer, the dark latent image and a residual image stored in the capacitor are reduced before the radiation for recording is irradiated.

Moreover, the applicant has also proposed reduction in the photoelectromotive force noise by adequately setting the barrier of the electric charge transport layer and the photoconductive layer for recording. In this method, a small amount of hole barrier is created and the holes are stored in the hole barrier by pre-exposure to make a flat band.

However, these methods are only applicable to the electrostatic recording material including the electric charge transport layer as described in Japanese Patent Application No. 10(1998)-232824 proposed by the applicant or the like, and the method described in Japanese Patent Application No. 10(1998)-232824 is not applicable to the other electrostatic recording materials described above.

Furthermore, hole barrier generation so as to cancel the photoelectromotive force at the interface between the electric charge transport layer and the photoconductive layer for recording is not easy.

Moreover, in the case where the dark current from the electrode on the reading light side is larger and a dark latent image having the reverse polarity of the electrostatic latent image is generated in the capacitor, the pre-exposure actually enhances the dark latent image.

The present invention has been conceived based on consideration of the above problems. An object of the present invention is therefore to provide an image information reading and recording method and an image information reading and recording apparatus enabling reduction in photoelectromotive force noise and stabilization of the noise in the case where a positive electrostatic recording material of optical reading type is used.

Another object of the present invention is to provide an image information reading and recording method and an image information reading and recording apparatus enabling reduction in a dark latent image formed immediately after voltage supply and stabilization of the dark latent image.

Still another object of the present invention is to provide an image information reading and recording method and an image information reading and recording apparatus enabling reduction and stabilization of high-voltage supply history noise generated by carrying out recording voltage supply and short circuit.

SUMMARY OF THE INVENTION

A first image information reading and recording method of the present invention is a method of carrying out reading and recording of image information by using an electrostatic recording material comprising a first electrode layer, a photoconductive layer exhibiting conductivity when receiving a recording electromagnetic wave representing the image information, and a second electrode layer disposed in this order, with a capacitor being formed between the first electrode layer and the second electrode layer for storing, as a latent image charge, an electric charge in accordance with the amount of energy of the electromagnetic wave. In the electrostatic recording material, the image information is recorded as an electrostatic latent image in the capacitor by exposure of the first electrode layer to the recording electromagnetic wave in a state where a recording voltage is applied between an electrode of the first electrode layer and an electrode of the second electrode layer, and the image information in accordance with the amount of the latent image charge is read in a state where the first electrode layer and the second electrode layer have the same potential.

The method comprises the steps of:

carrying out pre-reading in which pre-exposure light is irradiated on the photoconductive layer in a state where the electrode of the first electrode layer and the electrode of the second electrode layer have the same potential; and carrying out the recording after the pre-reading is stopped.

The electrostatic recording material used in the present invention comprises a first electrode layer, a photoconductive layer, and a second electrode layer disposed in this order and a capacitor formed between the first electrode layer and the second electrode layer. The electrostatic recording material can be any positive electrostatic recording material of optical reading type. In order to form the capacitor, the electrostatic recording material may have other layers or minute conductive materials (microplates) disposed further, as described in U.S. Pat. No. 4,535,468 or Japanese Patent Application No. 10(1998)-232824, for example.

As the "recording electromagnetic wave representing the image information", transmissive radiation representing transmissive radiation image information obtained by irradiating radiation such as X rays on a subject, or light emitted by excitation caused by radiation, such as fluorescence representing the transmissive radiation image information obtained by irradiating the transmissive radiation on phosphor (a scintillator), or general visible light representing image information can be used.

The "state where the first electrode layer and the second electrode layer have the same potential" means not only the state where the electrodes of the two layers have the same potential by being connected directly, but also the state where the electrodes of the two layers actually have the same potential although a slight potential difference can exist between the two electrodes, such as in the case of using imaginary short circuit of an operation amplifier or using a resistor.

It is preferable for pre-exposure light for the pre-reading to have high intensity so that an effect such as light fatigue which will be explained later can be obtained efficiently. Meanwhile, it is not necessary for the pre-exposure light to be irradiated for a long time (such as 10 seconds, for example), and a comparatively short time (such as 1 millisecond~1 second) is sufficient. Therefore, in the first image information reading and recording method of the present invention, it is preferable for energy density of the pre-exposure light to be 100 $Cd/m^2$ or more. More preferably, the energy density is approximately 1000 $Cd/m^2$ or more and duration of the pre-exposure light irradiation is set not less than 1 millisecond and not greater than 1 second, preferably not less than 10 milliseconds and not greater than 100 milliseconds.

It is also preferable for the pre-exposure light to be irradiated immediately before the supply of the high voltage for recording (within 1 second, for example), when duration of the effect due to the pre-exposure light irradiation is taken into consideration.

Prior to the pre-reading, it is preferable for the first image information reading and recording method of the present invention to carry out pre-voltage supply in which a voltage having a predetermined magnitude and a predetermined polarity is applied for a predetermined amount of time between the electrode of the first electrode layer and the electrode of the second electrode layer.

"Prior to the pre-reading" means at least the case where the pre-voltage supply starts before the pre-reading, and the pre-voltage supply may be stopped slightly before or later than the start of the pre-reading.

It is more preferable for the first image information reading and recording method of the present invention to carry out, prior to the recording of the electrostatic latent image, pre-processing in which the pre-voltage supply and the subsequent pre-reading are repeated a predetermined number of times at each time the electrostatic latent image is recorded.

A duty ratio (Ton/T) of ON-period or OFF-period of the pre-voltage supply (Ton, Toff) to one cycle of the pre-processing (in time T) for the repeated pre-voltage supply and pre-reading is set to 50% or more, preferably approximately 90%.

If the pre-processing repeating the pre-voltage supply and the pre-reading at each recording of the electrostatic latent image is carried out as has been described above, the recording is not carried out immediately after the reading due to the time necessary for the pre-processing, and an operator has to halt photographing because of pre-processing. Especially, in the case where repetition of the pre-processing is time-consuming, the suspension of photographing becomes substantially long. Furthermore, consecutive photographing having a short time for each cycle becomes difficult to be carried out. Moreover, if consecutive photographing (regardless of the time for each photographing) is carried out, the amount of noise gradually changes in each pre-processing and does not have long-term stability. A second image information reading and recording method of the present invention is to solve such problems.

In other words, the second image information reading and recording method of the present invention is a method of carrying out reading and recording of image information by using an electrostatic recording material comprising a first electrode layer, a photoconductive layer exhibiting conductivity when receiving a recording electromagnetic wave representing the image information, and a second electrode layer, with these layers disposed in this order and a capacitor being formed between the first electrode layer and the second electrode layer for storing, as a latent image charge, an electric charge in accordance with the amount of energy of the electromagnetic wave. In the electrostatic recording material, the image information is recorded as an electrostatic latent image in the capacitor by irradiation of the recording electromagnetic wave on the first electrode layer in a state where a recording voltage is applied between an electrode of the first electrode layer and an electrode in the second electrode layer, and the image information in accordance with the amount of the latent image charge is read in a state where the first electrode layer and the second electrode layer have the same potential. The second image information reading and recording method comprises the steps of:

carrying out preparation processing repeating, a predetermined number of times, preparatory pre-voltage supply supplying a voltage having a predetermined magnitude and a predetermined polarity between the electrode of the first electrode layer and the electrode of the second electrode layer for a predetermined amount of time and preparatory pre-reading irradiating pre-exposure light on the photoconductive layer in a state where the electrode of the first electrode layer and the electrode of the second electrode layer have the same potential; and carrying out the recording and the reading consecutively and a plurality of times after the preparation processing is stopped.

To carry out "the reading and the recording consecutively and a plurality of times" refers to so-called consecutive photographing. Upon carrying out the consecutive photographing after the preparation processing, not only the consecutive reading and recording may be carried out but also the consecutive reading and recording may be carried out in combination with the first method. For example, "pre-reading+recording+reading" may be defined as one cycle and be carried out consecutively. Alternatively, "pre-voltage supply+pre-reading+recording+reading" may be defined as one cycle and be carried out consecutively. Furthermore, "repeated pre-voltage supply and pre-reading+recording+reading" may be defined as one cycle and be carried out consecutively. These cycles may also be used in combination.

By carrying out the preparatory processing, time for the pre-processing immediately before the consecutive photographing can be reduced substantially, and can be cut completely in some cases.

In this second method, the energy density of the pre-exposure light for the preparatory pre-reading is set to 100 $Cd/m^2$, preferably equal to or larger than 1000 $Cd/m^2$. The duration of the pre-exposure light irradiation is set not less than 1 millisecond and not greater than 1 second, preferably not less than 10 milliseconds and not greater than 100 milliseconds.

The duration of the preparation processing for carrying out repeated preparatory pre-voltage supply and preparatory pre-reading is set at least 10 second or longer, preferably equal to or longer than 60 seconds. It is preferable for the duration to be set to almost equal to or more than the duration of the consecutive photographing. However, in order to sufficiently induce the effect of the preparation processing, the preparation processing is preferably carried out all the time the photographing is not carried out.

Furthermore, for the duration (Ton, Toff) of the ON-period or OFF-period of the preparatory pre-voltage supply in one cycle (the time T), 1~10 seconds is set for the ON-period, preferably approximately 1 second, and the duty ratio (Ton/T) is set to 70% or more, preferably approximately 90%.

It is preferable for the pre-exposure light or exposure light to be irradiated on the photoconductive layer from the side of the electrode layer on which the reading light is irradiated (usually from the second electrode layer side). It is also preferable for the pre-exposure light and the exposure light to have an almost constant amount of light over the entire surface of the electrostatic recording material.

A first image information reading and recording apparatus of the present invention is an apparatus for realizing the first image information reading and recording method. In other words, the first image information reading and recording apparatus of the present invention is an apparatus for carrying out reading and recording of image information by using an electrostatic recording material comprising a first electrode layer, a photoconductive layer exhibiting conductivity when receiving a recording electromagnetic wave representing image information, and a second electrode layer in this order, with a capacitor being formed between the first electrode layer and the second electrode layer for storing, as a latent image charge, an electric charge in accordance with the amount of energy of the electromagnetic wave. In the electrostatic recording material, the image information is recorded as an electrostatic latent image in the capacitor by irradiation of the recording electromagnetic wave on the first electrode layer in a state where a recording voltage is applied between an electrode of the first electrode layer and an electrode of the second electrode layer, and the image information in accordance with the amount of the latent image charge is read in a state where the first electrode layer and the second electrode layer have the same potential. The first image information reading and recording apparatus comprises:

voltage supply means for supplying a predetermined voltage between the electrode of the first electrode layer and the electrode of the second electrode layer;

pre-exposure means for irradiating pre-exposure light on the photoconductive layer; and control means for controlling the pre-exposure means and the voltage supply means so as to carry out pre-reading by causing the pre-exposure light to be irradiated on the photoconductive layer in a state where the electrode of the first electrode layer and the electrode of the second electrode layer have the same potential and to record the electrostatic latent image after stopping the pre-reading, by causing the recording electromagnetic wave to be irradiated on the first electrode layer in a state where a voltage for recording is applied between the electrode of the first electrode layer and the electrode of the second electrode layer.

In the first image information reading and recording apparatus of the present invention, it is preferable for the pre-exposure means to set energy density of the pre-exposure light to be equal to or larger than 100 $Cd/m^2$. It is also preferable for the pre-exposure means to set duration of the pre-exposure light irradiation to not less than 10 milliseconds and not greater than 1 second.

In the first image information reading and recording apparatus of the present invention, it is preferable for the control means to control the voltage supply means so that pre-voltage supply is carried out prior to the pre-reading. In the pre-voltage supply, a voltage having a predetermined magnitude and a predetermined polarity is applied between the electrode of the first electrode layer and the electrode of the second electrode layer for a predetermined period.

In the first image information reading and recording apparatus of the present invention, it is more preferable for the control means to control the pre-exposure means and the voltage supply means so as to carry out the pre-voltage supply and the subsequent pre-reading a predetermined number of times prior to each recording of electrostatic latent image.

A second image information reading and recording apparatus of the present invention is an apparatus for realizing the second image information reading and recoding method of the present invention. In other words, the second image information reading and recording apparatus is an apparatus for carrying out reading and recording of image information by using an electrostatic recording material comprising a first electrode layer, a photoconductive layer exhibiting conductivity when receiving a recording electromagnetic wave representing the image information and a second electrode layer disposed in this order, with a capacitor for storing, as a latent image charge, an electric charge in accordance with the amount of energy of the electromagnetic wave being formed between the first electrode layer and the second electrode layer. In the electrostatic recording material, the image information is recorded in the capacitor by exposure of the first electrode layer to the recording electromagnetic wave in a state where a recording voltage is applied between an electrode of the first electrode layer and an electrode of the second electrode layer, and the image information in accordance with the amount of the latent image charge is read in a state where the first electrode layer and the second electrode layer have the same potential. The second image information reading and recording apparatus comprises:

voltage supply means for supplying a predetermined voltage between the electrode of the first electrode layer and the electrode of the second electrode layer;

pre-exposure means for irradiating pre-exposure light on the photoconductive layer; and control means for controlling the pre-exposure means and the voltage supply means so that preparation processing repeating a predetermined number of times preparatory pre-voltage supply supplying a voltage having a predetermined magnitude and a predetermined polarity between the electrode of the first electrode layer and the electrode of the second electrode layer and preparatory pre-reading irradiating the pre-exposure light on the photoconductive layer in a state where the electrode of the first electrode layer and the electrode of the second electrode layer have the same potential is carried out and the recording and the reading are carried out consecutively and a plurality of times after the preparation processing is stopped.

In the second image information reading and recording apparatus of the present invention, it is preferable for the pre-exposure means to set energy density of the pre-exposure light to be equal to or larger than 100 $Cd/m^2$. It is also preferable for the pre-exposure means to set the duration of the pre-exposure light irradiation to not less than 1 millisecond and not greater than 1 second.

In any of the above methods and apparatuses, it is preferable for the electrostatic recording material to be of an optical reading type in which image information in accordance with the amount of the latent image charge is read by causing photoinductive discharge due to irradiation of the reading light (normally from the side of the second electrode layer) on the photoconductive layer exhibiting conductivity by exposure to the reading light in the state where the first electrode layer and the second electrode layer have the same potential.

The reading light is an electromagnetic wave for reading and not limited to visible light. The photoconductive layer exhibiting conductivity by receiving the reading light may also serve as the photoconductive layer exhibiting conductivity by receiving the electromagnetic wave for recording. Alternatively, the photoconductive layer exhibiting conductivity by receiving the reading light may be separate from the photoconductive layer exhibiting conductivity by receiving the electromagnetic wave for recording.

According to the first image information reading and recording method and apparatus of the present invention, the pre-reading in which the pre-exposure light is irradiated on the photoconductive layer is carried out in the state where the electrode of the first electrode layer and the electrode of the second electrode layer have the same potential, and an electrostatic latent image is recorded after the pre-reading is stopped. Therefore, a state of light fatigue (a state of trap accumulation) is temporarily created at the interface on which the pre-exposure light has been irradiated (an area of electron-hole pair formation), and photoelectromotive force noise generated upon irradiation of the reading light is reduced and stabilized due to the light fatigue state.

Furthermore, a space-charge state at the interfaces between the electrodes and the photoconductive layer can be alleviated and stabilized by the pre-exposure light. In other words, the high-voltage supply history noise can be reduced.

Moreover, as will be explained later, a current response showing a relationship between time t and a dark current I flowing in the electrostatic recording material upon the recording voltage supply and the short circuit is expressed as $I = t^{-n}$. In other words, when logI and logt are used, a state in which the current does not concentrate at a certain time constant is established. As behavior of the space charge at the interfaces between the electrodes and the photoconductive layer, a space charge having a short time constant (1 second or shorter) and having a long time constant (tens of milliseconds~approximately 1 minute or longer) exists. However, as has been described above, a comparatively short time (1 millisecond~1 second) is sufficient for the pre-voltage supply prior to the pre-reading, and only the space charge having the shorter time constant can respond if the pre-voltage supply is carried out for a short time and stopped.

Therefore, prior to the pre-reading, when the pre-voltage supply in which the voltage having the predetermined magnitude and the predetermined polarity is applied to the two electrodes for the predetermined amount of time is carried out, a space-charge state causing an apparent stable high-resistance state is created within the photoconductive layer or at the interfaces between the photoconductive layer and the electrodes, and a state of small dark latent image accumulation is also realized in the capacitor. For this reason, immediately after the recording voltage supply, conventional large dark latent-image noise is not generated but is in fact reduced and stabilized.

Moreover, as has been described above, since only the space charge having the short time constant can respond in the short voltage-supply. Therefore, if the pre-processing repeating the pre-voltage supply and the subsequent pre-reading the predetermined number of times is carried out prior to each recording of the electrostatic latent image, formation and release of shallow traps due to the space charge poured and discharged in a comparatively short time are facilitated and a state of stable accumulation of deep traps due to the space charge which is not poured or discharged unless a comparatively long time is spent can be established. This contributes to repeated stabilization of the high-voltage supply history noise caused by irradiation of light in existence of the electric field due to history of the voltage supply and the short circuit, and image data correction so as not to generate the high-voltage supply history noise in a reproduced image becomes possible.

Meanwhile, according to the second image information reading and recording method and apparatus of the present invention, the preparation processing repeating the preparatory pre-voltage supply and the preparatory pre-reading is carried out and the recording and the reading are carried out consecutively and a plurality of times after the preparation processing is stopped. Therefore, regardless of the time necessary for one cycle in the consecutive photographing, only the reading and the recording can be carried out repeatedly. In other words, the recording can be carried out immediately after the reading and the consecutive photographing can be carried out without long term pre-processing between photographing. Therefore, the second image information reading and recording method and apparatus can be excellent in long-term stability.

BRIEF DESCRIPTION OF THE DRAWINGS

FIG. 2 is a timing chart explaining a first operation of the radiation image photographing and reading apparatus adopting the present invention;

DESCRIPTION OF THE PREFERRED EMBODIMENT

Figure 1:
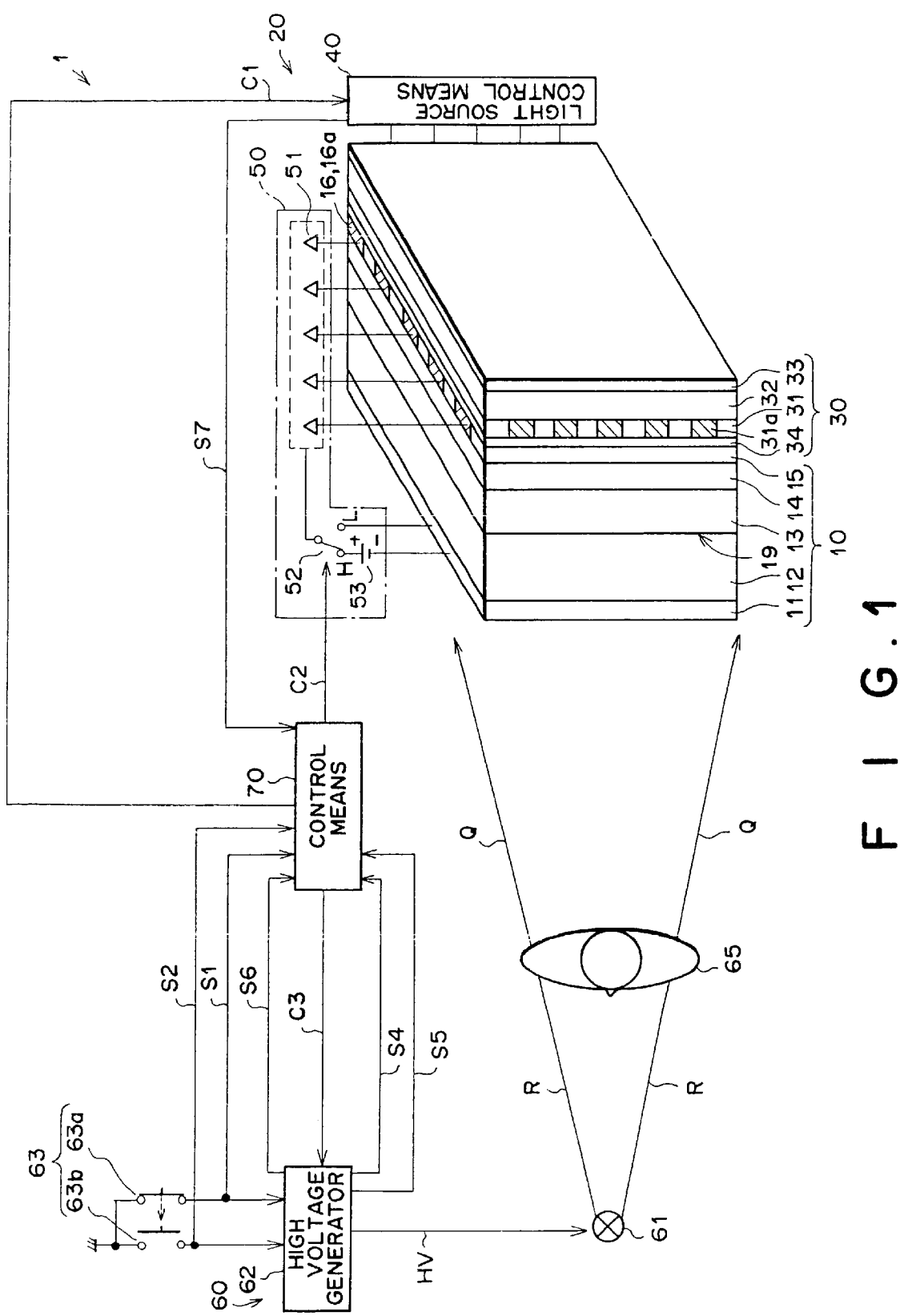
FIG. 1 is a schematic configuration of a radiation image photographing and reading apparatus to which an image information reading and recording method and an image information reading and recording apparatus of the present invention are applied.

Hereinafter, an embodiment of the present invention will be explained with reference to the accompanying drawings. FIG. 1 shows a schematic configuration of a radiation image photographing and reading apparatus to which an image information reading and recording method and an image information reading and recording apparatus of the present invention are applied.

As shown in FIG. 1, a radiation image photographing and reading apparatus 1 comprises a radiation emission unit 60 and a reading unit 20 having a solid-state radiation detector 10 (hereinafter simply called the detector in some cases) as an electrostatic latent image recording material, a planer light source 30 disposed on the detector 10, light source control means 40 for controlling the light source 30, and a current detection circuit 50 for reading an electric charge of the detector 10. These members are the same as in a conventional apparatus to which the present invention is not applied. The apparatus 1 adopting the present invention further comprises control means 70 connected to both the current detection circuit 50 and the radiation emission unit 60.

The detector 10 is an electrostatic recording material of improved direct conversion type (employing both a direct conversion method and the optical reading method) as has been described in Japanese Patent Application No. 10(1998)-232824. An electric charge is generated within a photoconductive layer 12 for recording, by irradiation of recording radiation as an electromagnetic wave representing image information (such as X-rays; hereinafter called recording radiation) passed through a subject on a first electrode layer 11 (a conductive layer). The electric charge is stored as a latent image charge in a capacitor 19 at an interface between the photoconductive layer 12 for recording and an electric charge transport layer 13. An electric charge is generated within a photoconductive layer 14 for reading by scanning a second electrode layer 15 (a conductive layer) with reading light (an electromagnetic wave for reading), and re-coupled with the latent image charge to generate a current in accordance with the amount of the latent image charge. The second electrode layer 15 as the electrode layer for reading comprises a plurality of linear electrodes (hatched portions in FIG. 1) aligned in a stripe-like shape. Hereinafter, the electrode in the second electrode later 15 is called a stripe electrode 16 and each of the linear electrodes is called an element 16a.

For the photoconductive layer 12 for recording, the electric charge transport layer 13, and the photoconductive layer 14 for reading, a-Se as an amorphous material is used as a main component thereof.

The planer light source 30 is an EL (electroluminescence) illuminant disposed on the detector 10 and comprising a conductive layer 31, an EL layer 32, and a conductive layer 33. An insulator 34 is located between the stripe electrode 16 of the detector 10 and the conductive layer 31. The conductive layer 31 comprises a plurality of elements 31a (hatched portions in FIG. 1) laid out in a stripe-like shape and each of the elements 31a crosses (in this embodiment, almost orthogonal to) each of the elements 16a of the stripe electrode in the detector 10. In this manner, a plurality of linear light sources formed by the elements 31a are laid out in a plane. Each of the elements 31a is connected to the light source control means 40.

As the EL layer 32, a material emitting EL light having approximately 470-nm wavelength is used in consideration of matching with a-Se as the main component of the photoconductive layer 14 for reading used in the detector 10.

The light source control means 40 applies a predetermined voltage between the elements 31a and the conductive layer 33 facing the elements. Upon reading, the voltage is applied individually to each of the elements 31a. Meanwhile the voltage is applied to a plurality of or all the elements 31a at the same time upon pre-exposure. For example, when the control means applies a predetermined direct current voltage between each of the elements 31a and the conductive layer 33 while sequentially switching the elements 31a, EL light is emitted from the EL layer 32 sandwiched between the elements 31a and the conductive layer 33. The EL light passed through the elements 31a is used as linear reading light (hereinafter called linear light). In other words, the planer light source 30 is equivalent to a plurality of small linear light sources aligned in a plane. By causing the EL light to be emitted from one end of the longitudinal direction of the stripe electrode 16 to the other end while sequentially switching the elements 31a, the entire surface of the stripe electrode 16 is electrically scanned with the linear light. The longitudinal direction of the elements 16a corresponds to a vertical scan direction and a direction to which the linear light extends is a direction of main scan.

Meanwhile, if the voltage is applied to the plurality of the elements 31a or all the elements 31a at the same time, the EL light is emitted almost uniformly over the entire surface of the stripe electrode 16 from the EL layer 32 due to the voltage supply. The EL light is used as pre-exposure light. In other words, the planer light source 30 is used not only as the reading light source but also a light source for pre-exposure which will be explained later. The planer light source 30 and the light source control means 40 function as pre-exposure means of the present invention.

A control signal C1 is input to the light source control means 40. When the control signal C1 is L (in a LOW state), a pre-exposure light mode for emitting the EL light as the pre-exposure light is used while a reading light mode for emitting the EL light as the reading light is adopted when the control signal C1 is H (in a HIGH state). When the control signal C1 is in a high impedance state, the EL light is not emitted from the planer light source 30.

The current detection circuit 50 comprises a plurality of current detection amplifiers 51 respectively connected at inverting input terminals thereof to the elements 16a of the stripe electrode 16. The first electrode layer 11 of the detector 10 is connected to one of inputs of a switch 52 and a negative electrode of a power supply 53. A positive electrode of the power supply 53 is connected to the other input of the switch 52. The switch 52 and the power supply 53 comprise voltage supply means in the present invention.

An output of the switch 52 is commonly connected to non-inverting input terminals of operation amplifiers not shown in FIG. 1 and respectively comprising each of the current detection amplifiers 51. By exposing the stripe electrode 16 to the linear light as the reading light from the planer light source 30 (scanning exposure), each of the current detection amplifiers 51 detects at the same time (in parallel) a current flowing through each of the elements 16a connected thereto.

A detailed configuration of the current detection amplifiers 51 is omitted here, since the configuration is out of the scope of the present invention. Various kinds of known configurations can be adopted. Depending on the configuration of the current detection amplifiers 51, connections between the switch 52, the power supply 53, and each of the elements 16a may be different from the above example.

The radiation emission unit 60 comprises a radiation source 61 for emitting radiation R, a high voltage generator 62 for generating power for driving the radiation source 61, and a switch 63 controlling photographing and connected to the high voltage generator 62. The switch 63 is a two-stage switch comprising a switch 63a and a switch 63b, and the switch 63b does not become ON unless the switch 63a is ON.

Signals S1 and S2 from the switches 63a and 63b, a stand-by signal S4 from the high voltage generator 62, an emission complete signal S5 indicating completion of radiation emission and a signal S6 indicating pre-set emission duration of the recording radiation, and an emission complete signal S7 from the light source control means 40 indicating emission of the pre-exposure light are input respectively to the control means 70 so that first to fourth operations which will be explained later are carried out automatically at predetermined timings. The control means 70 outputs the control signal C1, a control signal C2, and a control signal C3 to the light source control means 40, to the switch 52, and to the high voltage generator 62, respectively.

When the control signal C2 is HIGH, the switch 52 is switched to the power supply 53 and a direct current voltage is applied from the power supply 53 to the detector 10 (more specifically, between the electrode of the first electrode layer 11 and the stripe electrode 16). On the other hand, when the control signal C2 is LOW, the switch 52 is switched to the first electrode layer 11, and the electrode of the first electrode layer 11 and the stripe electrode 16 are short-circuited via an imaginary short circuit of the operation amplifiers which are not shown and comprise the current detection amplifiers 51. As a result, the two electrodes have the same potential. When the control signal C2 is in a high impedance state, the switch 52 is set to a middle point and the positive electrode of the power supply 53 is in a floating state. Therefore, no voltage is applied to the detector 10 and the two electrodes do not have the same potential. The high voltage generator 62 supplies a high voltage HV to the radiation source 61 when the control signal C3 is HIGH, and causes the radiation source 61 to emit the radiation R.

Operations of the radiation image photographing and reading apparatus 1 in the above configuration will be explained next. In timing charts shown in FIGS. 2, 3, 6 and 7, high-level periods are active periods in which the voltage is applied to the detector 10 or thee light (the pre-exposure light, the recording radiation, and the reading light) is irradiated. On the other hand, low-level periods (reference-level periods) are inactive periods which are the opposite of the above. For the pre-voltage supply in FIG. 3, a negative voltage period in which the voltage is lower than the reference voltage is also an active period.

Upon recording an electrostatic latent image in the detector 10 in the apparatus 1 adopting the present invention, control for starting and stopping the pre-exposure light as well as control for starting and stopping the pre-voltage supply between the electrode of the first electrode layer 11 and the stripe electrode 16 are carried out prior to supply of a recording voltage to the detector 10, which is different from a conventional apparatus. Hereinafter, the operations will be explained in detail.

FIG. 2 is a timing chart for explaining the first operation of the apparatus 1. In the first operation, an electrostatic latent image is recorded after pre-reading.

More specifically, upon starting the pre-exposure light emission, the control means 70 causes the control signal C2 input to the switch 52 to become LOW. Therefore, the switch 52 is switched to the first electrode layer 11 and the first electrode layer 11 and the stripe electrode 16 are actually short-circuited so as to have the same potential. The control means 70 then causes the control signal C1 input to the light source control means 40 to become LOW (meaning the pre-exposure light mode) and causes the planer light source 30 to emit the EL light as the pre-exposure light. The pre-exposure light is irradiated on the photoconductive layer 14 for reading. In this manner, the pre-reading is carried out.

The pre-exposure light for the pre-reading is preferably have strong intensity so as to efficiently create the light fatigue state, and duration of the pre-exposure light emission is not necessarily long (10 seconds, for example). Comparatively short duration (1 millisecond~1 second) is sufficient. For this reason, energy density of the pre-exposure light ($Cd/m^2$) is approximately 100~10000 $Cd/m^2$ (2 $mW/cm^2$, for example) and the duration is approximately 50 milliseconds.

In order to stop this pre-reading, the control means 70 causes the control signal C1 input to the light source control means 40 to be in a high impedance state and stops the EL light emission from the planer light source 30.

After the pre-reading is stopped in this manner, radiation Q for recording is irradiated on the first electrode layer 11 in a state where the voltage for recording is applied between the electrode of the first electrode layer 11 and the stripe electrode 16, and the electrostatic latent image is recorded. More specifically, the switch 52 is switched to the power source 53 so that the electric charge generated in the photoconductive layer 12 for recording is stored in the capacitor 19. From the power supply 53, the direct current voltage having a predetermined magnitude is applied as the recording voltage between the electrode of the first electrode layer 11 and the stripe electrode 16 to electrify the two electrodes. The supply of the recording voltage may be carried out not only at the time of completion of the pre-exposure light irradiation on the photoconductive layer but also slightly before the completion.

After the recording voltage supply, the high voltage HV is applied from the high voltage generator 62 to the radiation source 61, and the radiation R is emitted from the radiation source 61. The radiation R is irradiated on a subject 65 and the recording radiation Q representing radiation image information of the subject 65 and passed through the subject 65 is irradiated on the detector 10 for the predetermined time set in advance. Charged couples of positive and negative charges are generated within the recording photoconductive layer 12 of the detector 10. The negative charge is concentrated on each of the elements 16a of the stripe electrode 16, along a predetermined electric field distribution. The negative charge is then stored as a latent image charge in the capacitor 19 which is the interface between the recording photoconductive layer 12 and the electric charge transport layer 13. The amount of the latent image charge is almost proportional to a dose of the radiation having been irradiated. Therefore, the latent image charge represents the electrostatic latent image. Meanwhile, the positive charge generated within the recording photoconductive layer 12 is attracted to the first electrode layer 11 and re-coupled with a negative charge supplied from the power supply 53 and disappears.

When the electrostatic latent image is read from the detector 10, the control signal C1 becomes HIGH (meaning the reading light mode) and the switch 52 is connected to the first electrode layer 11 of the detector 10. The light source control means 40 applies a predetermined direct current voltage between each of the elements 31a and the conductive layer 33 while sequentially switching the elements 31a, and the entire surface of the detector 10 is electrically scanned with the linear light emitted from the EL layer 32.

Charged couples of positive and negative charges are generated by the scan with the linear light, within the photoconductive layer 14 where the linear light corresponding to a vertical scan position enters. The positive charge moves rapidly within the charge transport layer 13 toward the negative charge (latent image charge) stored in the capacitor 19 to re-couple with the latent image charge in the capacitor 19, and disappears. Meanwhile, the negative charge generated in the photoconductive layer 14 re-couples with a positive charge supplied to the stripe electrode 16 from the power supply 53 and disappears. In this manner, the negative charge stored in the capacitor 19 of the detector 10 disappears by re-coupling and a current is generated within the detector 10 due to the movement of the electric charge upon the re-coupling. This current is detected simultaneously by the current detection amplifiers 51 connected respectively to the elements 16a. The current flowing through the detector 10 upon reading is in accordance with the latent image charge, that is, in accordance with the electrostatic latent image. Therefore, by detecting this current, the electrostatic latent image is read. In other words, an image signal representing the electrostatic latent image is obtained.

Upon starting and stopping the pre-exposure light irradiation on the reading photoconductive layer 14 and upon starting the recording voltage supply to the detector 10, timings may be controlled based on an instruction to the control means 70 by an operator. However, it is preferable for the control of starting and stopping the pre-exposure light irradiation and the control of starting the recording voltage supply to be carried out automatically at predetermined timings.

For this purpose, the control means 70 may comprise a timer so that the control signals C1 through C3 are generated after a predetermined time set in advance has elapsed. Alternatively, the pre-exposure light irradiation may be started in connection with pressing-down the switch 63a. After the pre-exposure light irradiation for a predetermined period, suspension of the pre-exposure light irradiation is detected by using the pre-exposure light emission complete signal S7 as a trigger or by using a sensor, and the voltage is applied to the detector 10.

It is needless to say that the control of recording and reading is preferably carried out automatically at predetermined timings.

As has been described above, according to the apparatus 1 adopting the electrostatic latent image recording method of the present invention, pre-reading in which the pre-exposure light is irradiated on the reading photoconductive layer 14 is carried out in the state where the electrode of the first electrode layer 11 and the stripe electrode 16 have the same potential. After stopping the pre-reading, the electrostatic latent image is recorded by irradiating the radiation Q for recording in the state where the recording voltage is applied between the two electrodes. Therefore, a light fatigue state (trap accumulation state) is temporarily created at the surface of the reading photoconductive layer 14 (an area of electron-hole pair generation) where the pre-exposure light has been irradiated. As a result, photoelectromotive force noise which can be generated upon the pre-exposure light irradiation is reduced and stabilized by the light fatigue state.

Figure 3:
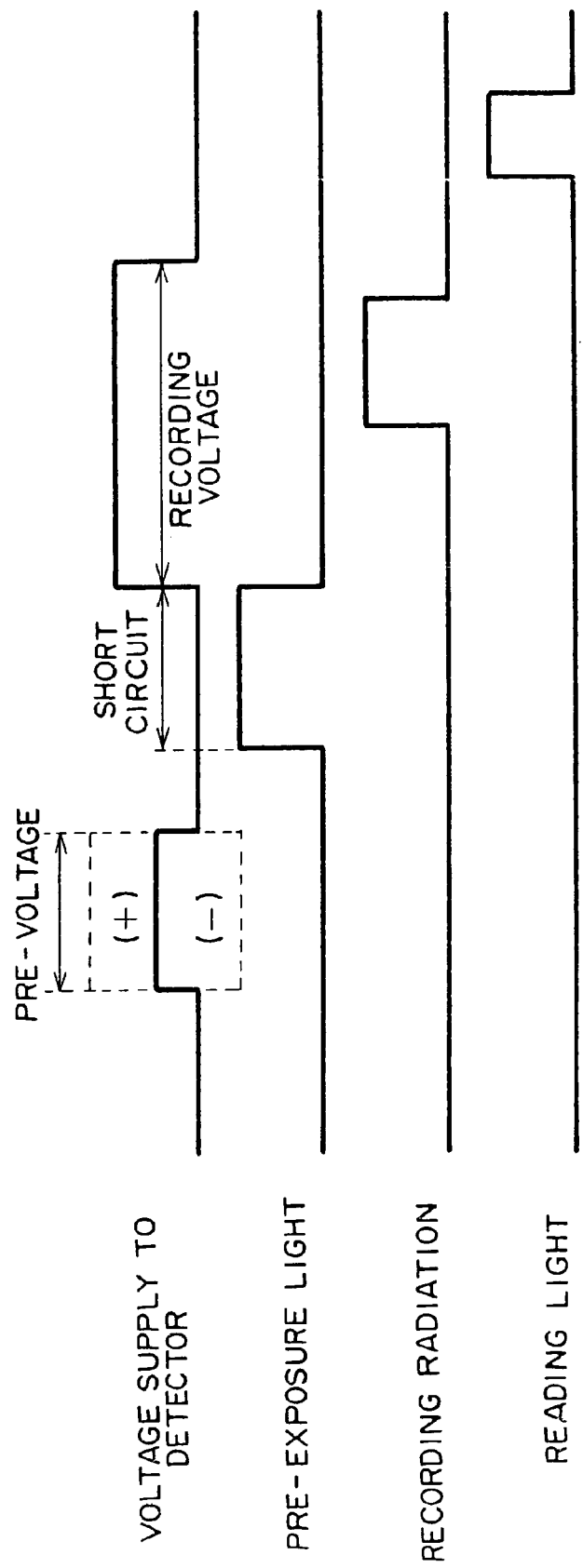
FIG. 3 a timing chart explaining a second operation of the radiation image photographing and reading apparatus adopting the present invention.
Figure 4:
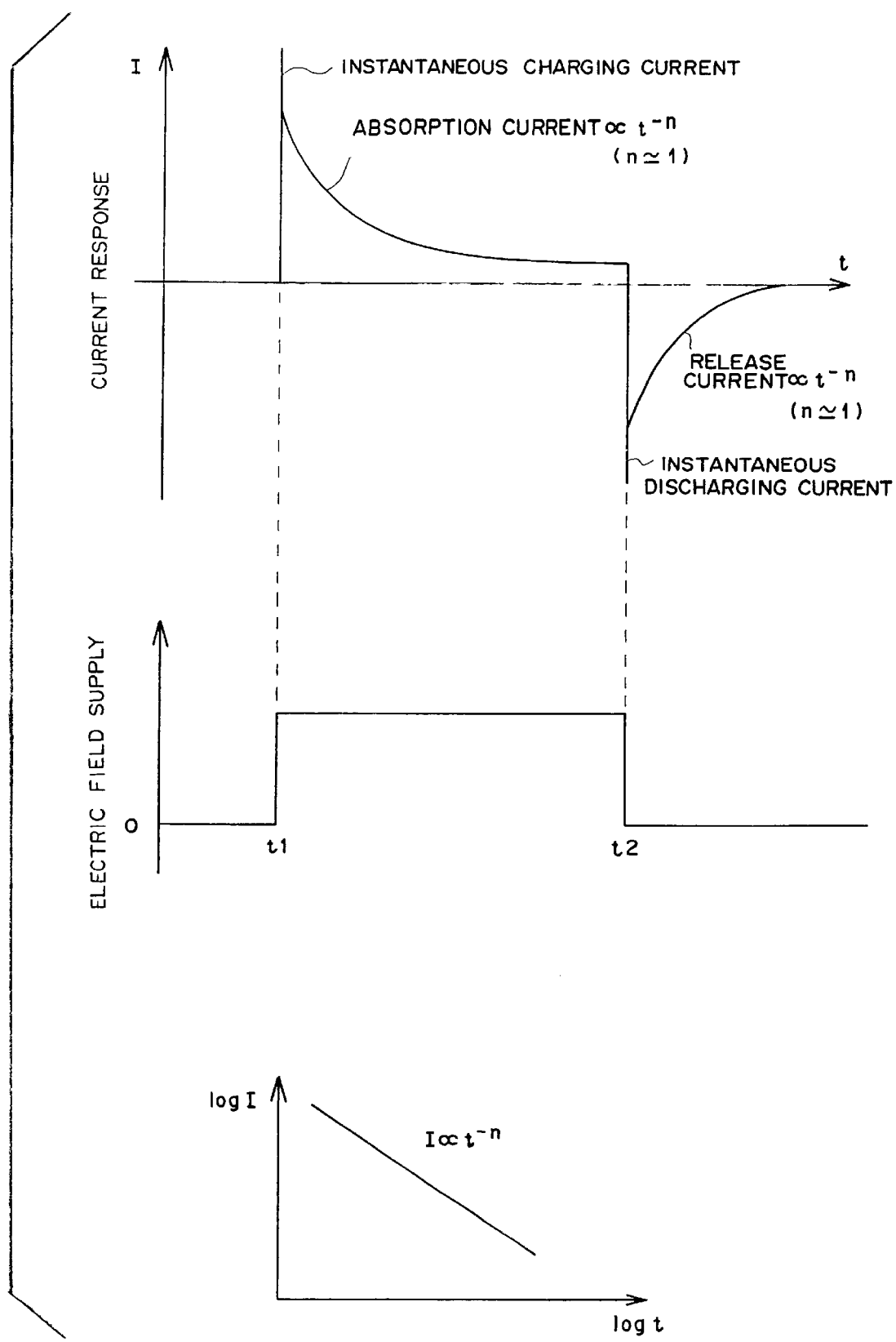
FIG. 4 is a diagram showing a time response of a dark current component generated upon applying and stopping an electric field to a photoconductive layer.
Figure 5:
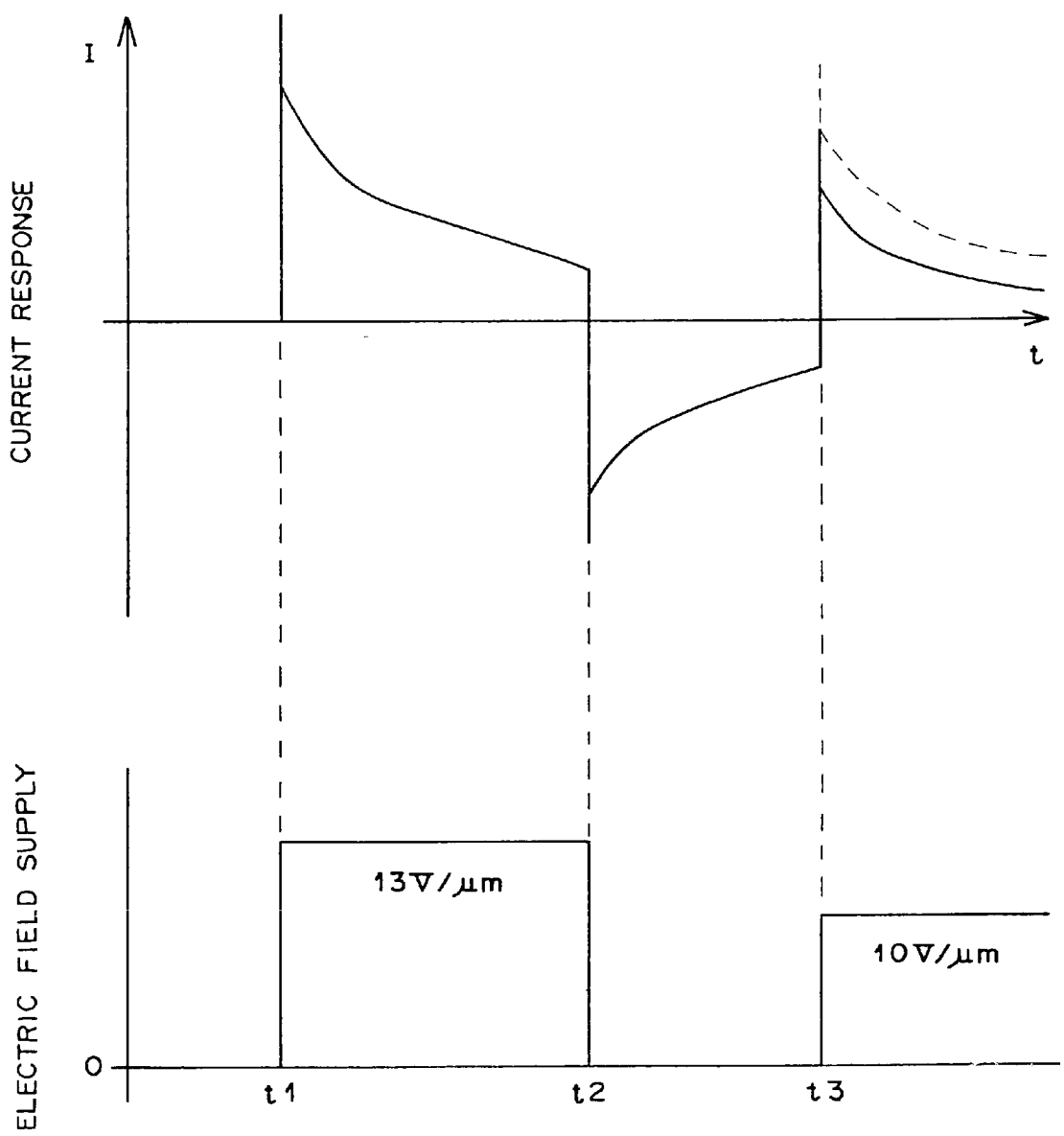
FIG. 5 is a diagram showing the time response in a recording process.

The second operation of the radiation image photographing and reading apparatus 1 of the present invention in the above configuration will be explained next. FIG. 3 is a timing chart explaining the second operation of the apparatus 1. FIG. 4 is a diagram showing a basic time response characteristic of a dark current component (hereinafter called a current characteristic) generated upon applying and stopping an electric field to the photoconductive layer. FIG. 5 is a diagram showing the current characteristic in a recording process. In FIG. 5, the current characteristic in the pre-exposure is not shown.

In the first operation described above, the electrostatic latent image is recorded after the pre-reading. In the second operation, prior to the pre-reading in the first operation, pre-voltage supply which is an operation of supplying a voltage having a predetermined magnitude and a predetermined polarity (hereinafter called the pre-voltage) for a predetermined period between the electrode of the first electrode layer 11 and the stripe electrode 16 is carried out. An ON-time Ton of the pre-voltage supply is set to within 1 second, and the pre-exposure light is irradiated within 1 second after the pre-voltage supply is stopped.

More specifically, before the pre-exposure light is irradiated on the reading photoconductive layer 14, the switch 52 is switched to the power supply 53, and the pre-voltage is applied from the power supply 53 to the electrode of the first electrode layer 11 and the stripe electrode 16 for the predetermined period of time.

In this second operation, the pre-voltage supply starts at least before the pre-reading starts, and the pre-voltage supply may be stopped slightly earlier or later than the start of the pre-reading.

FIG. 1 shows the case where the pre-voltage whose magnitude and polarity are the same as those of the recording voltage is applied. However, by causing the power supply 53 to enable voltage change and polarity inversion, the magnitude and the polarity of the pre-voltage can be different from those of the recording voltage.

Between the start of the voltage supply (generally a high voltage) to the two electrodes of the detector 10 and the short circuit, an electric charge is poured from the electrodes into the photoconductive layer 12 for recording. The electric charge is trapped as a space charge and leaked as a dark current in the photoconductive layer 12 instead of being trapped as the space charge.

The dark current becomes a substantially large instantaneous charging current in the beginning (t1) of the electric field (voltage) supply, as shown in FIG. 4. Thereafter, the dark current becomes an absorption current gradually decreasing with time and reaches a certain leakage current value. On the other hand, when the electric filed supply is completely stopped, a large instantaneous discharging current having a direction opposite to that of the instantaneous charging current flows in the beginning (t2) of the suspension of the electric field supply. Thereafter, a release current decreasing gradually with time flows and reaches approximately 0. In other words, the level of the dark current immediately after the electric field supply is larger than the level of the dark current in a stable state (a stable leakage current state). This phenomenon is more conspicuous when the supplied electric field is larger (that is, when the supplied voltage is higher), and 10 minutes or more may be necessary to reach the stable leakage current level.

This phenomenon refers to a fact that the detector has resistance becoming higher with time. In other words, the device resistance is not constant, and the longer the voltage supply lasts, the higher the resistance becomes.

This phenomenon is not greatly affected by the thickness of the photoconductive layer, and should be considered as accumulation of the space charge at the interfaces causing the resistance of the detector to become higher. In other words, the state of the space charge at the interfaces changes with time.

As shown in FIG. 4, this phenomenon shows a state of the current response indicating a relationship between the dark current I and the time t becoming $I \propto t^{-n}$. In other words, when this phenomenon is considered by using logI and logt, the current does not concentrate at a certain time constant, meaning that the space charge poured or discharged in a comparatively short period and the space charge poured or discharged in a comparatively long time exist at the same time. In other words, as the behavior of the space charge at the interfaces between the electrodes and the photoconductive layer, the space charge having a short time constant (1 second or shorter) and the space charge having a long time constant (tens of milliseconds~approximately 1 minute or longer) exist.

Furthermore, even if the dark current is temporarily stabilized, the dark current level tends to reach a previous value when the voltage supply is resumed after suspension of the electric field supply caused by the short circuit. Therefore, a dark latent image due to the high-level dark current immediately after the electric field supply contributes largely to the reading noise. Moreover, the amount of the dark latent image changes with an absorption current period which is a period from the voltage supply to irradiation of the recording radiation and with usage history. Therefore, correction of image data so as not to cause the dark latent image noise to appear in a reproduced image is difficult.

Meanwhile, if the pre-voltage is applied (if the pre-voltage supply is carried out) for the predetermined period between the electrode of the first electrode layer 11 and the stripe electrode 16 prior to the pre-reading as in the second operation, the instantaneous charging current generated at the time of the recording electric field supply as well as the absorption current are added to a release current at the time (t3) the recording electric field is applied after the pre-voltage supply is stopped. Therefore, as shown in FIG. 5, the magnitude of the absorption current and the instantaneous charging current at the time of the recording electric field supply becomes smaller than in the case where the recording electric field is applied after the two electrodes of the detector 10 are short-circuited for a long time (a dashed line in FIG. 5). The magnitude then reaches the leakage current value in accordance with the recording electric field. This is a state where a negative space charge enabling stable high resistance is established inside the reading photoconductive layer 14 or at the interface between the reading photoconductive layer 14 and the stripe electrode 16 while a state of low dark latent image accumulation is realized within the capacitor 19. In other words, supplying the pre-voltage having a high voltage value for a comparatively short time immediately before recording can replace supply of the recording electric field for a long time. In the case where the pre-voltage has a slightly excess voltage value, a dark current having the reverse polarity temporarily flows and a state of apparent high-resistance is created.

Therefore, if the recording is carried out by applying the recording electric field in a short time (within 1 second) after the pre-voltage supply, conventional large dark latent image noise is reduced. Therefore, the dark latent image noise is reduced and stabilized.

Figure 6:
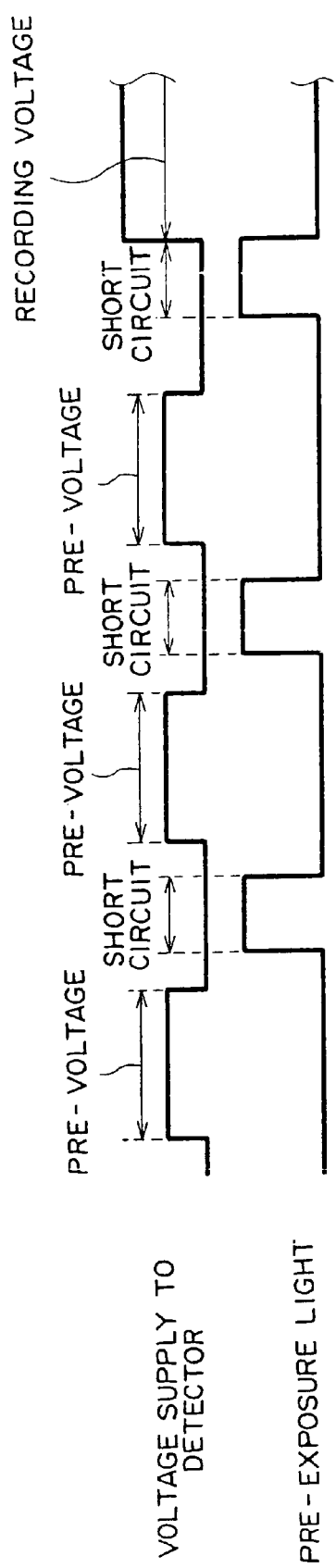
FIG. 6 is a timing chart explaining a third operation of the radiation image photographing and reading apparatus adopting the present invention.

The third operation of the radiation image photographing and reading apparatus 1 of the present invention in the above configuration will be explained next. FIG. 6 is a timing chart explaining the third operation of the apparatus 1.

In the third operation, after carrying out pre-processing repeating the pre-voltage supply and the subsequent pre-reading in the second operation a predetermined number of times, the electrostatic latent image is recorded. The duty ratio (Ton/T) of the ON-time or the OFF-time (Ton, Toff) of the pre-voltage supply to one cycle (in time T) of the pre-processing carrying out the repeated pre-voltage supply and the pre-reading is set to approximately 50%~90%. The number of repetition of the cycles is approximately 3.

As has been described above, only the space charge having the comparatively short time constant can respond if the pre-voltage supply is carried out for a short period and stopped. Therefore, if the pre-processing repeating the pre-voltage supply and the subsequent pre-reading the predetermined number of times is carried out prior to each recording of an electrostatic latent image, formation and release of shallow traps generated by the space charge poured and discharged in the comparatively short period are facilitated while deep traps due to the space charge poured and discharged in the comparatively long time can be stably accumulated. This contributes to repetitive stabilization of high-voltage supply history noise generated by irradiation of light in existence of the electric field due to the history of the voltage supply and the short circuit, and image data can be corrected so that the high-voltage supply history noise does not appear in a reproduced image.

Figure 7:
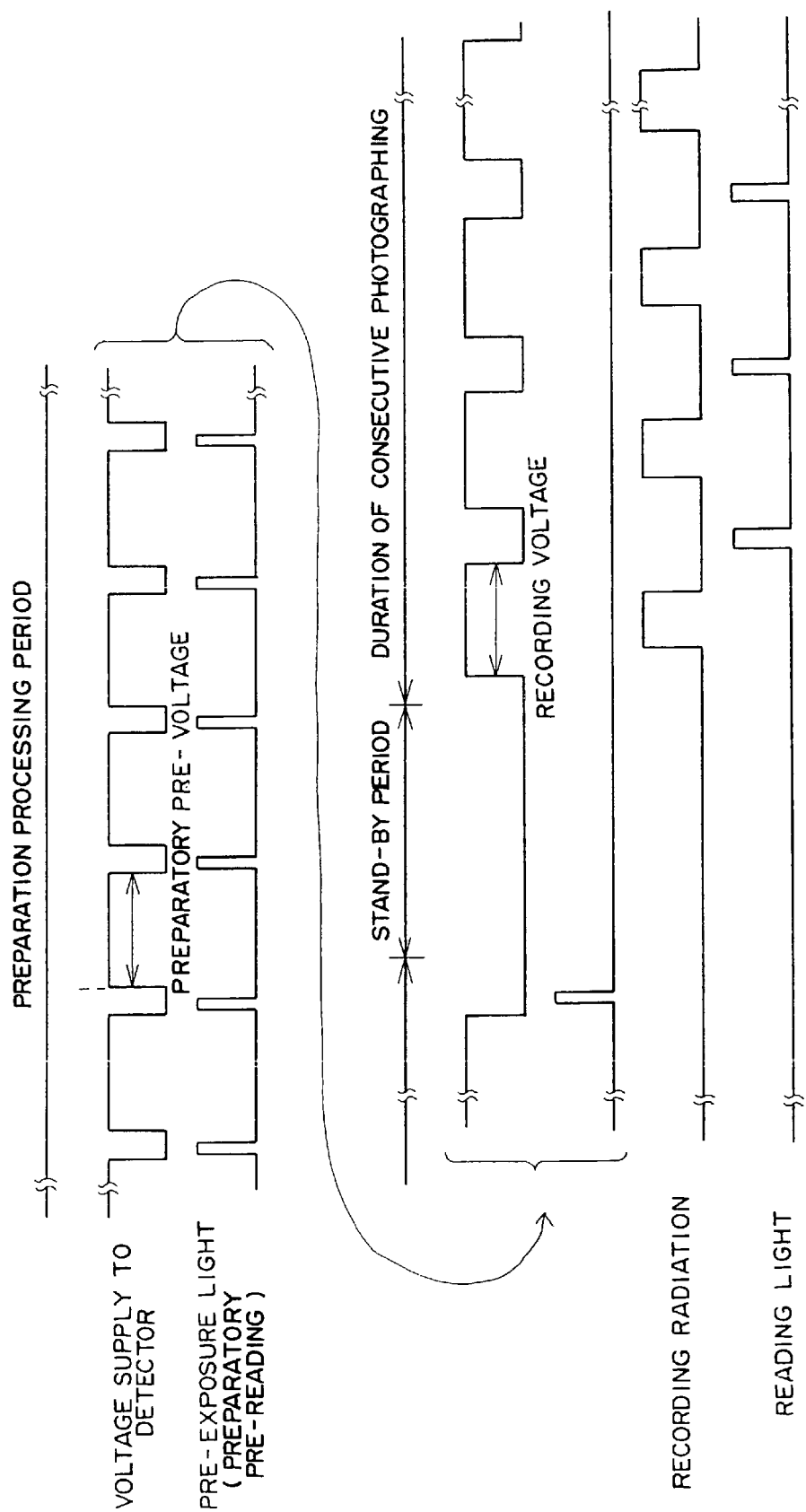
FIG. 7 is a timing chart explaining a fourth operation of the radiation image photographing and reading apparatus adopting the present invention.

A fourth operation of the radiation image photographing and reading apparatus 1 in the above configuration will be explained next. FIG. 7 is a timing chart explaining the fourth operation of the apparatus 1.

In the third operation described above, the pre-processing repeating the pre-voltage supply and the pre-reading at each recording of the electrostatic latent image is carried out. In this case, recording is not carried out immediately after reading due to the necessity of the pre-processing. Furthermore, the amount of noise gradually changes at each pre-processing if consecutive photographing is carried out, and the apparatus does not have excellent long-term stability. The fourth operation is to solve this problem, and preparatory processing repeating preparatory pre-voltage supply and preparatory pre-reading a predetermined number of times is carried out in the fourth operation. In the preparatory pre-voltage supply, the voltage (pre-voltage) having the predetermined magnitude and the predetermined polarity is applied to the electrode of the first electrode layer 11 and the stripe electrode 16. In the preparatory pre-reading, the pre-exposure light is irradiated on the reading photoconductive layer 14 in the state where the electrode of the first electrode layer 11 and the stripe electrode 16 have the same potential. Thereafter, the consecutive photographing repeating recording and reading is carried out.

The preparatory pre-voltage supply is almost the same as the pre-voltage supply in the second operation. However, the ON-time of the preparatory pre-voltage supply within one cycle (T) is approximately 1 to 10 seconds, preferably approximately 1 second, which is different from the second operation. The duty ratio (Ton/T) of the ON-time or OFF-time (Ton, Toff) is approximately 50~90%, and the time necessary for the preparatory processing is at least 1 minute in total, which is almost the same as or longer than the total duration of the consecutive photographing. When no photographing is carried out, the preparatory processing may always be carried out.

The preparatory pre-reading is practically the same as the pre-reading in the first operation. The energy density of the pre-exposure light is approximately 100~10000 Cd/m$^2$ (2 mW/cm$^2$, for example), and the duration of the pre-exposure light irradiation is approximately 50 milliseconds.

In the fourth operation, as can be estimated from the third operation, the system has already been in the stable state due to the preparatory processing, and various kinds of processing in the first to third operations is often unnecessary. Therefore, regardless of the time length of one cycle at the time of consecutive photographing, the recording can be carried out immediately after the reading.

Furthermore, the consecutive photographing can be carried out without the pre-processing between the recording and the reading, which leads to more long-term stability than in the third operation. As a result, the stability lasts longer and a timing of starting recording in the consecutive photographing is not necessarily in synchronization with a timing of completion of the preparatory processing. In other words, duration of a stand-by period between the preparatory processing and the consecutive photographing can be set arbitrarily. For example, regardless of the duty ratio and the ON-time of the preparatory pre-voltage supply and the duration of the preparatory processing, the stand-by time may be set to 1~10 seconds.

Processing time of the preparatory processing is at least 10 seconds, preferably 1 minute or longer. The processing time is equal to or longer than the duration of the consecutive photographing. In the case where time for completion of the preparatory processing is not sufficient, the preparatory processing is actually difficult to be carried out. In other words, depending on the usage of the apparatus, the time for the preparatory processing at each time of consecutive photographing may not be secured.

Therefore, upon actual usage, the first to fourth operations described above are carried out in combination, depending on the required reduction in the noise and the usage of the apparatus.

The radiation image photographing and reading apparatus adopting the image information reading and recording method and apparatus of the present invention has been explained above. However, the present invention is not limited to the above embodiment. The present invention can be applied to any apparatus which carries out the pre-reading and the pre-voltage supply or the pre-processing and the preparatory processing repeating the pre-reading and the pre-voltage supply prior to the recording voltage supply to the electrostatic recording material (solid-state radiation detector).

For example, the electrostatic recording material used in the present invention can be any positive electrostatic recording material of optical reading type, comprising a first electrode layer, a photoconductive layer, and a second electrode layer disposed in this order, with a capacitor formed between the first electrode layer and the second electrode layer. In order to form the capacitor, other layers or minute conductive materials (microplates) may further be disposed, such as in U.S. Pat. No. 4,535,468 and Japanese Patent Application No. 10(1998)-232824, for example.

The configuration of the pre-exposure means may not be limited to the configuration of the planer light source 30 and the light control means 40 described above. The pre-exposure means may have any configuration as long as a position at which the beam or the linear light is irradiated can be moved relatively to the electrostatic recording material. For example, the pre-exposure means may be separated from the light source for reading. Alternatively, the pre-exposure means may have a configuration for mechanically moving the light source relatively to the electrostatic recording material rather than a configuration for the electric scan.

In addition, all of the contents of the Japanese Patent Application No. 11(1999)-194546 are incorporated into this specification by reference.

What is claimed is:

1. A method of carrying out reading and recording of image information by using an electrostatic recording material comprising a first electrode layer, a photoconductive layer exhibiting conductivity when receiving a recording electromagnetic wave representing the image information, and a second electrode layer disposed in this order, with a capacitor being formed between the first electrode layer and the second electrode layer for storing, as a latent image charge, an electric charge in accordance with the amount of energy of the electromagnetic wave, the electrostatic recording material recoding the image information as an electrostatic latent image in the capacitor by exposure of the first electrode layer to the recording electromagnetic wave in a state where a recording voltage is applied between an electrode of the first electrode layer and an electrode of the second electrode layer, and reading the image information in accordance with the amount of the latent image charge in a state when the first electrode layer and the second electrode layer have the same potential, the method comprising the steps of:

carrying out pre-reading in which pre-exposure light is irradiated on the photoconductive layer in a state where the electrode of the first electrode layer and the electrode of the second electrode layer have the same potential; and carrying out the recording after the pre-reading is stopped.

2. An image information reading and recording method as claimed in claim 1, wherein energy density of the pre-exposure light is 100 $Cd/m^2$ or more, and duration of irradiation of the pre-exposure light is not less than 1 millisecond and not greater than 1 second.

3. An image information reading and recording method as claimed in claim 1 or 2, further comprising the step of:

carrying out pre-voltage supply in which a voltage having a predetermined magnitude and a predetermined polarity is applied for a predetermined duration to the electrode of the first electrode layer and the electrode of the second electrode layer, prior to the pre-reading.

4. An image information reading and recording method as claimed in claim 3, wherein the pre-voltage supply and the pre-reading subsequent to the pre-voltage supply are repeated a predetermined number of times prior to the recording, at each time the electrostatic latent image is recorded.

5. A method of carrying out reading and recording of image information by using an electrostatic recording material comprising a first electrode layer, a photoconductive layer exhibiting conductivity when receiving a recording electromagnetic wave representing the image information, and a second electrode layer, with these layers disposed in this order and a capacitor being formed between the first electrode layer and the second electrode layer for storing, as a latent image charge, an electric charge in accordance with the amount of energy of the electromagnetic wave, the electrostatic recording material recording the image information as an electrostatic latent image in the capacitor by irradiation of the recording electromagnetic wave on the first electrode layer in a state where a recording voltage is applied between an electrode of the first electrode layer and an electrode in the second electrode layer, and reading the image information in accordance with the amount of the latent image charge in a state where the first electrode layer and the second electrode layer have the same potential, the image information reading and recording method comprising the steps of:

carrying out preparation processing repeating, a predetermined number of times, preparatory pre-voltage supply supplying a voltage having a predetermined magnitude and a predetermined polarity between the electrode of the first electrode layer and the electrode of the second electrode layer for a predetermined amount of time and preparatory pre-reading irradiating pre-exposure light on the photoconductive layer in a state when the electrode of the first electrode layer and the electrode of the second electrode layer have the same potential; and carrying out the recording and the reading consecutively and a plurality of times after the preparation processing is stopped.

6. An image information reading and recording method as claimed in claim 5, wherein energy density of the pre-exposure light is 100 $Cd/m^2$ or more, and duration of irradiation of the pre-exposure light is not less than 1 millisecond and not greater than 1 second.

7. An apparatus for carrying out reading and recording of image information by using an electrostatic recording material comprising a first electrode layer, a photoconductive layer exhibiting conductivity when receiving a recording electromagnetic wave representing the image information, and a second electrode layer disposed in this order, with a capacitor being formed between the first electrode layer and the second electrode layer for storing, as a latent image charge, an electric charge in accordance with the amount of energy of the electromagnetic wave, the electrostatic recording material recording the image information as an electrostatic latent image in the capacitor by irradiation of the recording electromagnetic wave on the first electrode layer in a state where a recording voltage is applied between an electrode of the first electrode layer and an electrode of the second electrode layer, and reading the image information in accordance with the amount of the latent image charge in a state when the first electrode layer and the second electrode layer have the same potential, the image information reading and recording apparatus comprising:

voltage supply means for supplying a predetermined voltage between the electrode of the first electrode layer and the electrode of the second electrode layer;

pre-exposure means for irradiating pre-exposure light on the photoconductive layer; and control means for controlling the pre-exposure means and the voltage supply means so as to carry out pre-reading by causing the pre-exposure light to be irradiated on the photoconductive layer in a state where the electrode of the first electrode layer and the electrode of the second electrode layer have the same potential and to record the electrostatic latent image after stopping the pre-reading, by causing the recording electromagnetic wave to be irradiated on the first electrode layer in a state where a voltage for recording is applied between the electrode of the first electrode layer and the electrode of the second electrode layer.

8. An image information reading and recording apparatus as clamed in claim 7, wherein the pre-exposure means sets energy density of the pre-exposure light to 100 $Cd/m^2$ or more, and sets duration of irradiation of the pre-exposure light to not less than 1 millisecond and not greater than 1 second.

9. An image information reading and recording apparatus as claimed in claim 8, wherein the control means controls the voltage supply means so that pre-voltage supply in which a voltage having a predetermined magnitude and a predetermined polarity is applied between the electrode of the first electrode layer and the electrode of the second electrode layer for predetermined duration is carried out prior to the pre-reading.

10. An image information reading and recording apparatus as claimed in claim 9, wherein the control means controls the pre-exposure means and the voltage supply means so that the pre-voltage supply and the pre-reading subsequent thereto are repeated a predetermined number of times prior to the recording, at each time the electrostatic image is recorded.

11. A apparatus for carrying out reading and recording of image information by using an electrostatic recording material comprising a first electrode layer, a photoconductive layer exhibiting conductivity when receiving a recording electromagnetic wave representing the image information and a second electrode layer disposed in this order, with a capacitor for storing, as a latent image charge, an electric charge in accordance with the amount of energy of the electromagnetic wave being formed between the first electrode layer and the second electrode layer, the electrostatic recording material recording the image information in the capacitor by exposure of the first electrode layer to the recording electromagnetic wave in a state where a recording voltage is applied between an electrode of the first electrode layer and an electrode of the second electrode layer, and reading the image information in accordance with the amount of the latent image charge in a state when the first electrode layer and the second electrode layer have the same potential, the image information reading and recording apparatus comprising:

voltage supply means for supplying a predetermined voltage between the electrode of the first electrode layer and the electrode of the second electrode layer;

pre-exposure means for irradiating pre-exposure light on the photoconductive layer; and control means for controlling the pre-exposure means and the voltage supply means so that preparation processing repeating, a predetermined number of times, preparatory pre-voltage supply supplying a voltage having a predetermined magnitude and a predetermined polarity between the electrode of the first electrode layer and the electrode of the second electrode layer for a predetermined amount of time and preparatory pre-reading irradiating the pre-exposure light on the photoconductive layer in a state when the electrode of the first electrode layer and the electrode of the second electrode layer have the same potential is carried out and the recording and the reading are carried out consecutively and a plurality of times after the preparation processing is stopped.

12. An image information reading and recording apparatus as clamed in claim 11, wherein the pre-exposure means sets energy density of the pre-exposure light to 100 $Cd/m^2$ or more, and sets duration of irradiation of the pre-exposure light to not less than 1 millisecond and not greater than 1 second.

* * * * *